UNITED STATES PATENT OFFICE.

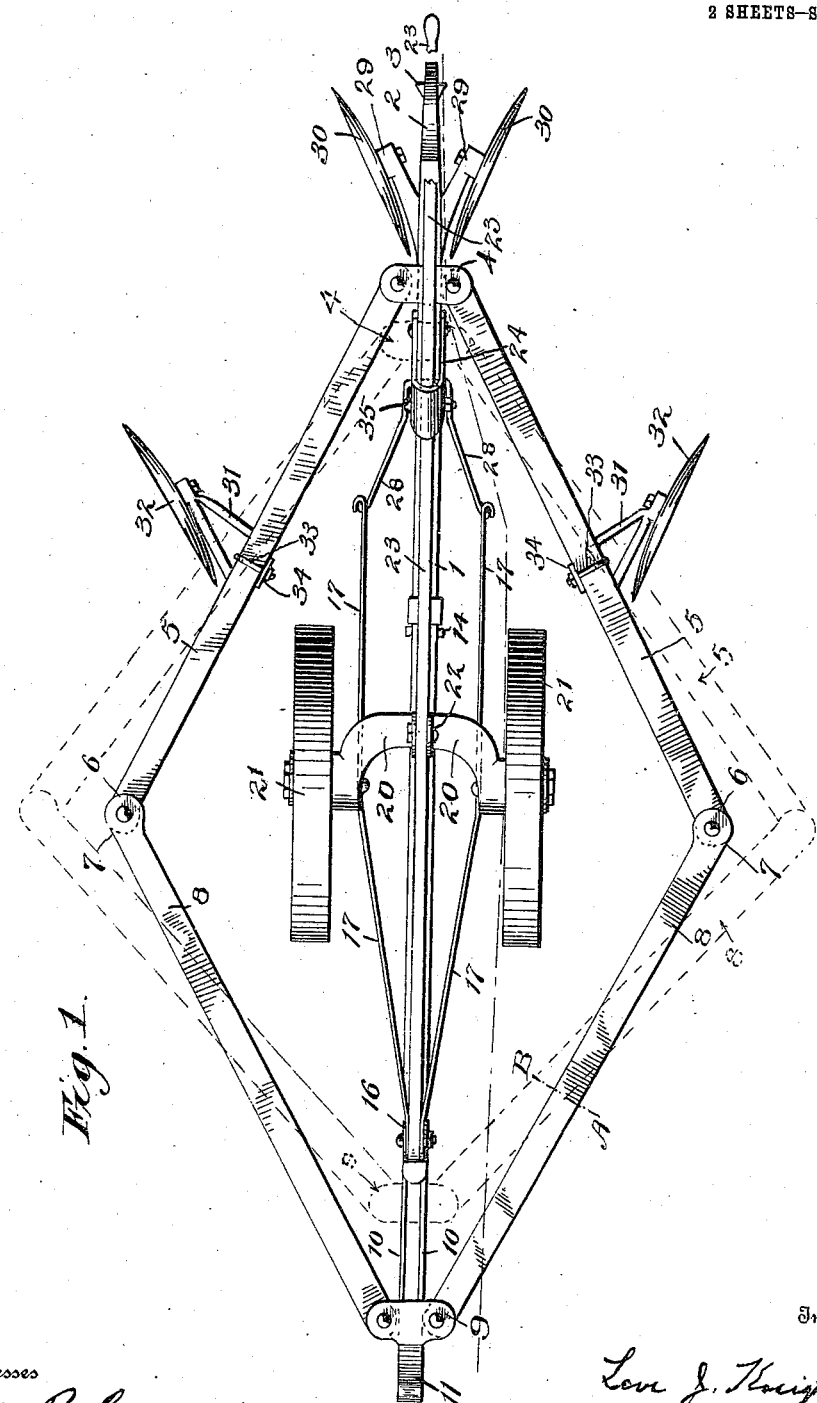

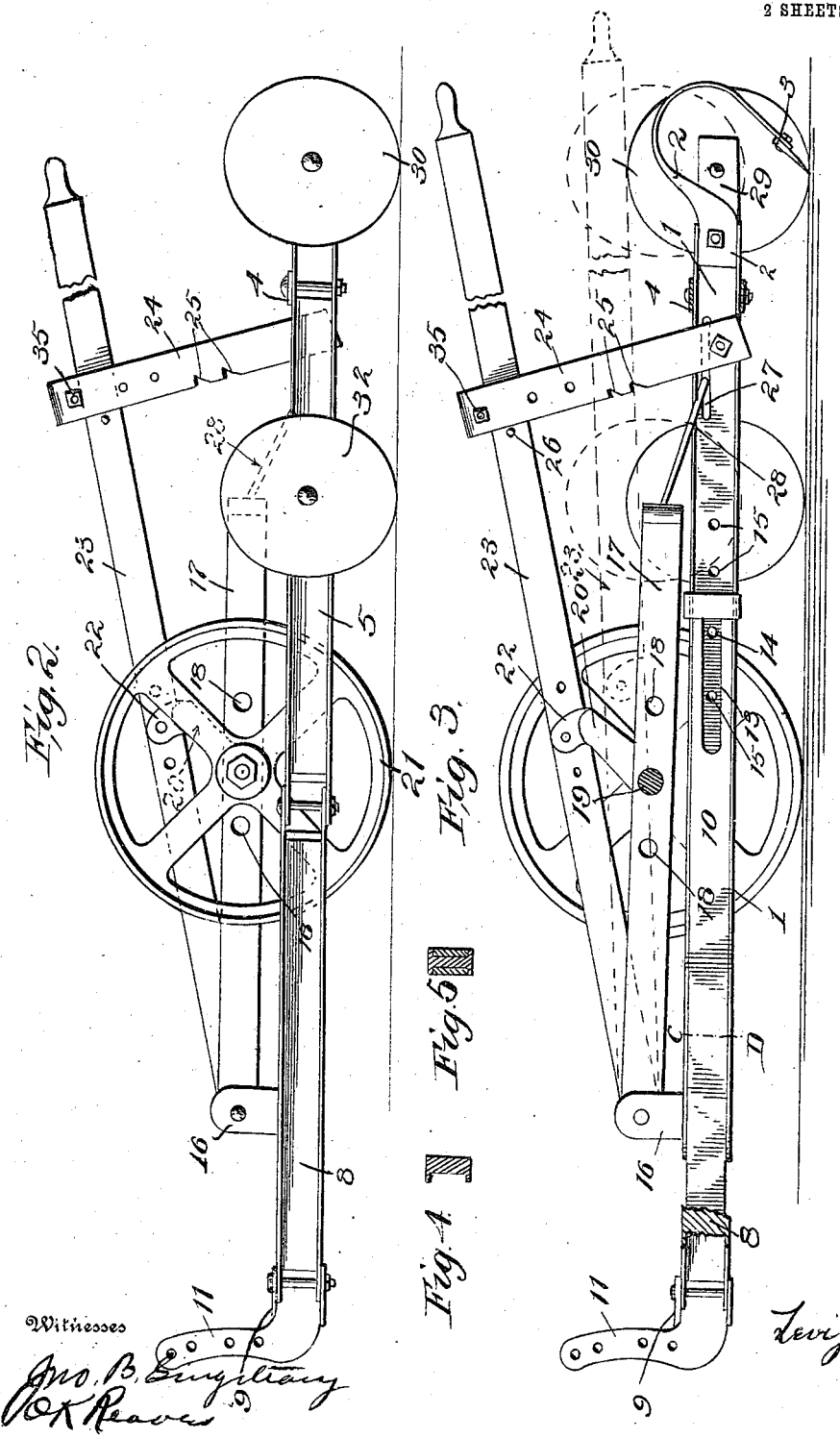

LEVI J. KNIGHT, OF BRADENTOWN, FLORIDA.

HARROW.

987,887.  Specification of Letters Patent.  Patented Mar. 28, 1911.

Application filed November 1, 1909. Serial No. 525,683.

*To all whom it may concern:*

Be it known that I, LEVI J. KNIGHT, a citizen of the United States, residing at Bradentown, in the county of Manatee and State of Florida, have invented certain new and useful Improvements in Harrows, of which the following is a specification.

This invention relates to disk harrows and its object is to provide a harrow of the sulky type which can be readily manipulated without the necessity of riding thereon.

A further object is to provide a harrow the frame of which can be quickly elevated to lift the disks from the ground and enable the complete harrow to make an abrupt turn.

Another object is to provide an angular, laterally extensible and contractible frame having simple means for securing it in adjusted position.

A still further object is to provide a novel form of disk holding bracket, the same being mounted in a novel manner.

Other objects are generally to improve upon the construction and arrangement of the parts with a view to increasing the efficiency and durability of devices of this character.

With these and other objects in view the invention consists in certain novel details of construction and combinations of parts hereinafter more fully described and pointed out in the appended claims, it being understood that various changes in the proportions and minor details, may be made without departing from the spirit or sacrificing any of the advantages of the invention.

In the accompanying drawings the preferred form of the invention has been shown.

In said drawings, Figure 1 is a plan view of a machine embodying the present improvements, one of the positions of the side bars being shown by dotted lines. Fig. 2 is a side elevation of the harrow. Fig. 3 is a longitudinal section. Fig. 4 is a section on line A—B, Fig. 1. Fig. 5 is a section on line C—D, Fig. 3.

Referring to the figures by characters of reference, 1 designates a centrally disposed I-beam provided at its rear end with a standard 2 carrying a plow 3 while ears 4 extend laterally from the beam 1 near its rear end, said ears being arranged in pairs. Channeled side bars 5 are pivotally connected to these pairs of ears and are extended forward along diverging lines, the front ends of said bars being formed with ears 6. These ears are pivotally connected to similar ears 7 formed at the rear ends of forwardly converging channeled side bars 8. The front ends of the bars 8 are in turn pivotally connected to ears 9 extending laterally from parallel extension strips 10, there being an upstanding arm 11 secured to the front ends of these strips and provided with a series of apertures 12 any one of which is designed to receive a hook or other device to which the draft animal is connected. The strips 10 extend along opposite faces of the I-beam 1 and are guided by the flanges thereof, each strip being formed with a longitudinal slot 13 through which extends a stop pin 14. This pin may be placed in any one of a series of openings 15 in the beam 1 and constitutes means for limiting the movement of the strips 10 in one direction. A guide band 10' is secured to the rear ends of strips 10 and extends around beam 1, this band serving to hold the strips in proper position between the flanges of the I-beam.

A yoke 16 is pivotally mounted on the front end of beam 1 and has rearwardly diverging side strips 17 pivotally mounted therein, each of these strips being provided with a series of openings 18 any one of which is designed to receive a stud 19. Each stud projects through one end of an arch 20 and constitutes a bearing for a wheel 21 and any suitable means, such as a nut, may be utilized for securing each stud in the arch and side strips. Ears 22 extend upward from the center of the arch and a lever 23 is secured between them, one end of the lever being fastened in the yoke 16 while the other end thereof is slidably mounted in an elongated loop 24 upstanding from, and pivotally connected to the rear portion of beam 1. This loop has teeth or notches 25 designed to be engaged by a pin 26 carried by the lever and whereby said lever can be held at any desired angle to the beam 1. A slot 27 is formed in beam 1 near loops 24 and a guide bail 28 is slidably mounted therein, the ends of the bail being pivotally connected to the rear ends of the side strips 17. The bail is so shaped as to lie close to the sides of beam 1 so as to be held against transverse movement relative thereto and thus hold beam 1 at all times properly centered within yoke 20.

Arms 29 diverge rearwardly from the back end of beam 1 and each has a concavo-convex harrow disk 30 journaled therein, the said disks being disposed in forwardly converging planes and at opposite sides of plow 3. One or more triangular brackets 31 are adjustably mounted in the channel of each bar 5 and a disk 32 similar to disks 30, heretofore described is mounted on each bracket and at an angle to the line of draft. A U-bolt 33 extends through each bracket 31 and straddles the bar 5, said bolt being secured in a plate 34 mounted on the inner face of bar 5. The flanges of bar 5 prevent the bracket 31 from tilting or swinging out of proper position and the U-bolt constitutes sufficient securing means for preventing sliding after the adjustment of the bracket has been effected.

It will be understood of course, that when the machine is drawn forward the disks will rotate to cut the soil, the small plow 3 breaking that portion of the soil between the rearmost disks. When it is desired to make an abrupt turn, the lever 23 may be drawn down so as to catch the pin 26 in one of the notches 25 and this will elevate the front end of the machine. As said machine is nearly balanced on its wheels 21, the rear end can then be lifted from the ground and one of the wheels used as a pivot to turn the harrow. To regulate the depth of the work the pin 26 can be placed in any one of a series of apertures 35 in loops 24 so as to hold the frame at a predetermined elevation with respect to the bottoms of the wheels 21.

When it is desired to spread the machine laterally, lever 23 is pressed down and a pin 26 brought into engagement with a notch 25. The front end of the machine is then tilted downward against the ground and held stationary while the rear end is pushed forward. The strips 10 and band 10′ will thus move back along beam 1 and the bars 5 and 8 be shifted laterally. Pin 14 can then be readjusted so as to prevent the band from moving forward. To elongate the frame the pin 14 is adjusted forward in beam 1 for a desired distance and when the machine is drawn forward the strips 10 will be drawn longitudinally on beam 1 until band 10′ moves against the pin.

The wheels 21 can be adjusted backward or forward by shifting the studs 19 in openings 18. Bail 28 by sliding in slot 27 allows the strips 17 to change their angles relative to beam 1, but, as heretofore stated it serves to hold the beam 1 properly centered at all times.

What is claimed is:

1. The combination with a central extensible beam, and adjustable means for limiting the extension of the beam, of a frame, a wheel supported arch connected to an intermediate portion of the beam, a connection between one end of the frame and the beam, a slidable connection between the other end of the frame and the beam, said frame and beam being tiltably mounted on the wheels, an adjusting lever attached to the frame and arch, and coöperating means on the beam and lever for holding the lever and beam in fixed relation.

2. The combination with an extensible beam, of a frame, a wheel supported arch connected to and supporting the intermediate portion of the frame, pivotal connections between the frame and beam, an adjusting lever connected to the frame and arch, means for locking the lever and arch at predetermined angles to the beam, a laterally extensible quadrilateral frame pivotally connected at opposed corners to the respective end portions of the beam, means upon the beam for locking the frame against extension movement, and tilling devices carried by the frame.

3. The combination with an extensible central beam having a slot, of a jointed frame, a wheel supported arched axle connected to the frame, rearwardly diverging side strips adjustably mounted on the axle and connected to the beam, a lever connected to the strips and beam and adjustably connected to the arch of the axle, a guide bail connecting the side strips and engaging the beam, said bail extending into the slot in the beam and being shaped to straddle and lie close against the sides of the beam.

4. The combination with an extensible central beam having a slot, of a jointed frame, a wheel supported arched axle connected to the frame, rearwardly diverging side strips adjustably mounted on the axle and connected to the beam, a lever connected to the strips and beam and adjustably connected to the arch of the axle, a guide bail connecting the side strips and engaging the beam, said bail extending into the slot in the beam and being shaped to straddle and lie close against the sides of the beam, means extending from the beam for engaging the lever to hold it against movement relative to the beam, and tilling devices carried by the frame.

5. The combination with a central beam including an I structure, and strips slidably mounted upon opposite faces of said structure, said strips being connected and having slots, of a jointed frame connected to the beam, a wheel-supported axle connected to the frame, means carried by the axle for elevating the beam and frame, and a stop pin adjustably engaging the I structure of the beam and projecting into the slots in the strips of said beam to limit the relative movement of the strips and I structure.

In testimony whereof I affix my signature in presence of two witnesses.

LEVI J. KNIGHT.

Witnesses:
 JNO. B. SINGETTARY,
 W. H. TUCKER.